United States Patent [19]
Fassauer

[11] 3,804,303
[45] Apr. 16, 1974

[54] SYSTEM FOR METERING PARTICULATE MATERIAL
[76] Inventor: Arthur L. Fassauer, P.O. Box 615, Canyon, Tex. 79015
[22] Filed: Sept. 20, 1972
[21] Appl. No.: 290,648

Related U.S. Application Data
[63] Continuation-in-part of Ser. No. 121,254, March 5, 1971.

[52] U.S. Cl................. 222/193, 222/227, 222/242, 222/410, 222/564, 259/8
[51] Int. Cl............................................. B67d 5/54
[58] Field of Search........... 222/193, 195, 216, 226, 222/227, 228, 239, 236, 240, 242, 241, 330, 333, 405, 178, 319, 353, 411, 412, 413, 414, 564, 408, 410; 259/7, 8, 180; 239/680, 681, 687, 222; 214/17 B

[56] References Cited
UNITED STATES PATENTS

| | | | |
|---|---|---|---|
| 3,109,657 | 11/1963 | Dreyer............................ | 222/242 X |
| 3,177,058 | 4/1965 | Slayter............................ | 239/222 X |
| 3,038,643 | 6/1962 | Van Der Lely et al......... | 222/227 X |
| 3,373,901 | 3/1968 | Pfeoffer.......................... | 222/240 X |
| 2,435,039 | 1/1948 | Harper............................ | 222/227 X |
| 2,833,445 | 5/1958 | Spiers............................. | 222/227 X |
| 676,391 | 6/1901 | Cope............................... | 222/410 X |

FOREIGN PATENTS OR APPLICATIONS
913,671  5/1961  Great Britain...................... 222/242

Primary Examiner—Stanley H. Tollberg
Assistant Examiner—Larry Martin
Attorney, Agent, or Firm—Richards, Harris & Medlock

[57] ABSTRACT

A mass of particulate material stored in a hopper is bottom unloaded and passed through several stages of aeration and fluidization to condition the material and place it in a relatively uncompacted state. The material is conditioned with a minimum of vibration of the material mass so that the mass remains a homogenous mixture of densities and does not stratify into powdery and coarse materials. The conditioned material is fed to a distributor ring wherein it is further aerated and fluidized into an uncompacted state and moved in a uniform volumetric flow through an annular array of holes into a pneumatic conveyor. Becasue the material is placed in an uncompacted state while being maintained a homogenous mixture of densities, a very precise mass of material may be metered out as a linear function of the time of delivery. With the present system, preselected masses of material can be delivered with extremely high accuracy.

40 Claims, 14 Drawing Figures

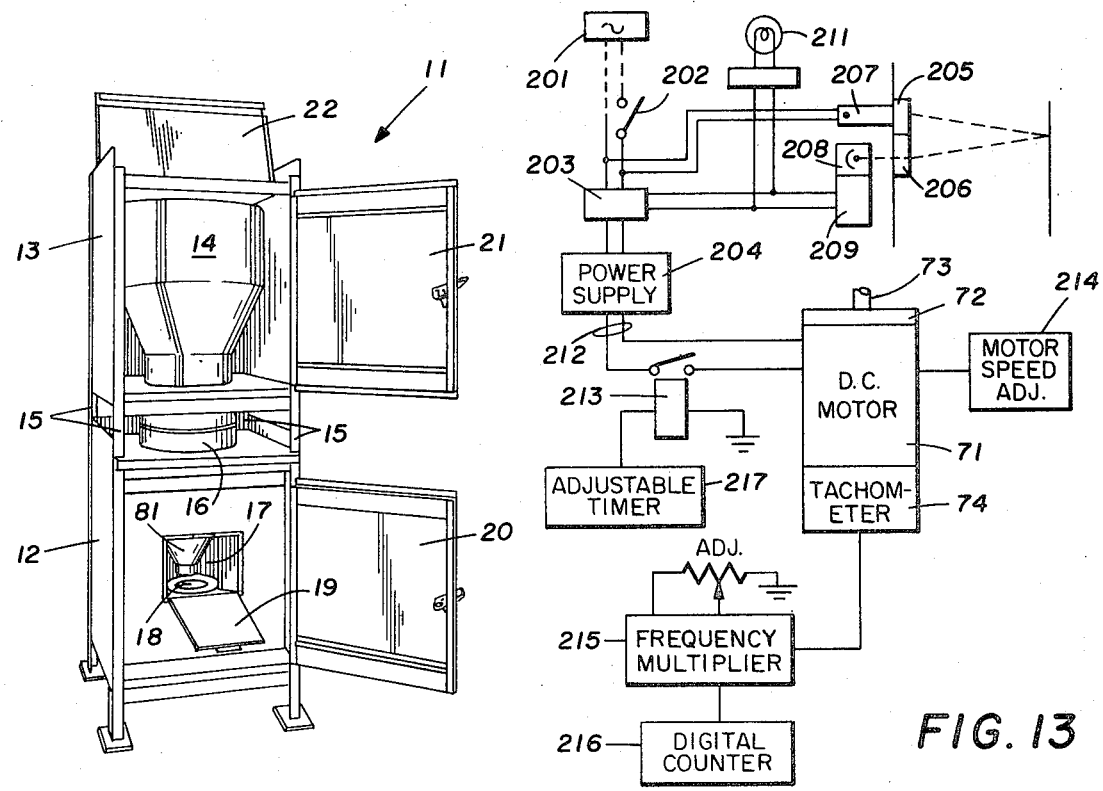
FIG. 1
FIG. 13
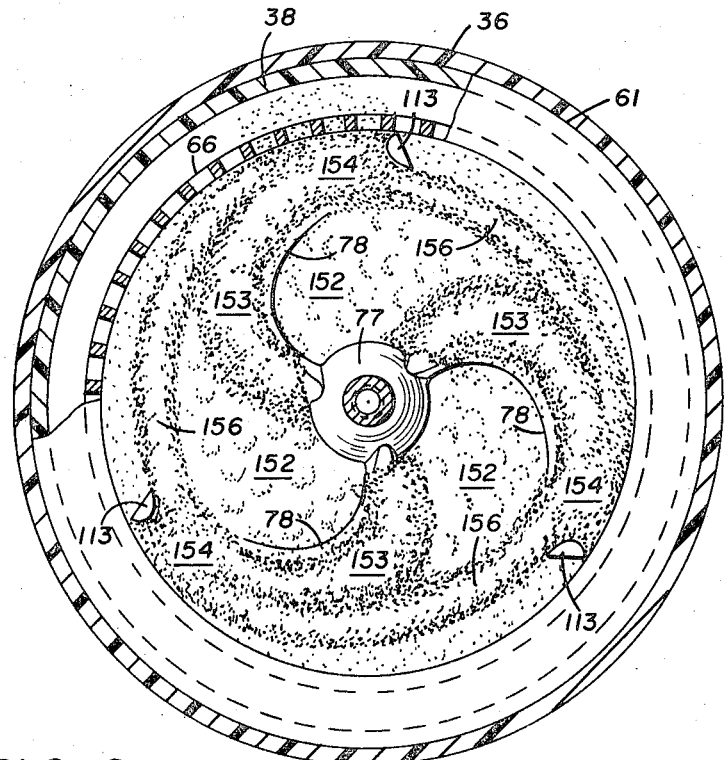
FIG. 6

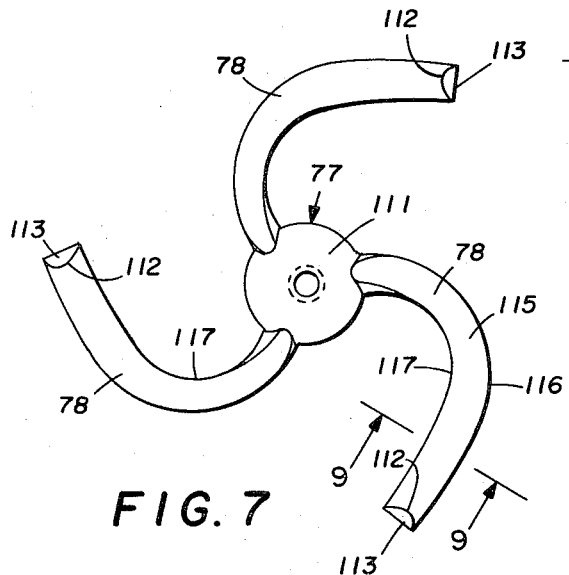
FIG. 7
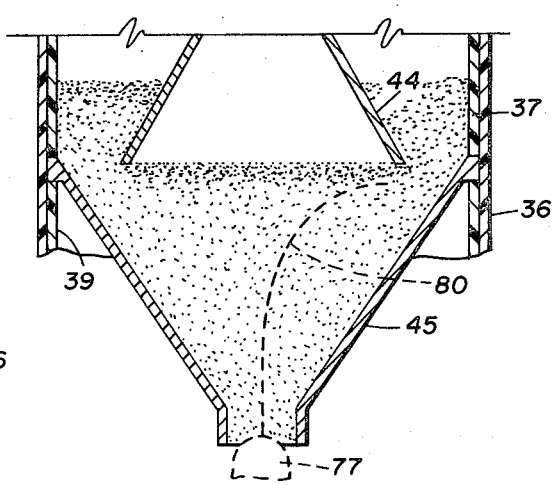
FIG. 14
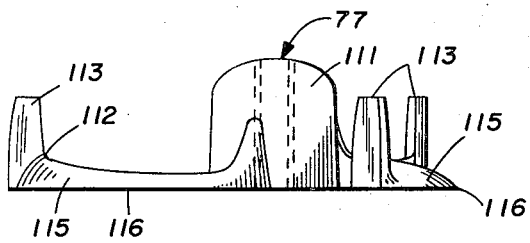
FIG. 8
FIG. 9
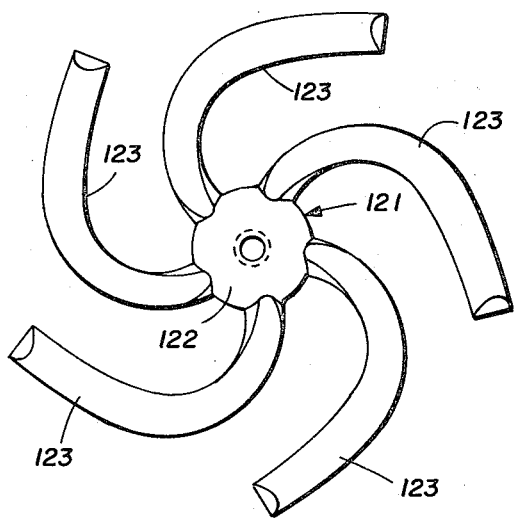
FIG. 10
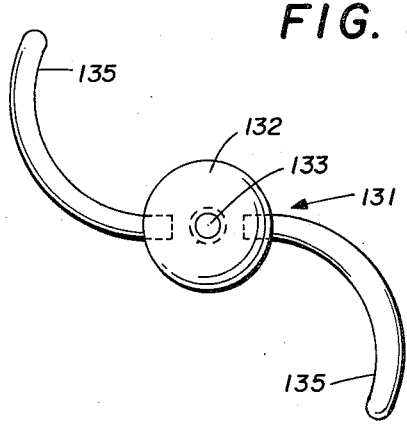
FIG. 11
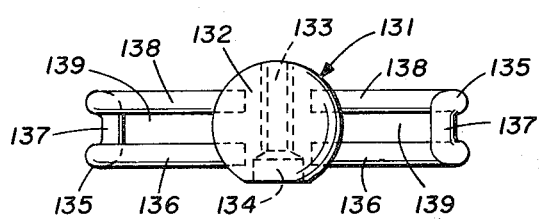
FIG. 12

3,804,303

SYSTEM FOR METERING PARTICULATE MATERIAL

CROSS REFERENCE TO RELATED APPLICATION

This application is a continuation-in-part of an application entitled GRANULAR MATERIAL METERING DEVICE, Ser. No. 121,254, filed Mar. 5, 1971, in the name of Arthur L. Fassauer.

BACKGROUND OF THE INVENTION

1. Field of the Invention

The invention relates to particulate material metering, and more particularly, to metering devices and methods wherein the material is fluidized and aerated to an uncompacted state prior to volumetric metering to achieve a high degree of accuracy over a wide range of masses.

2. History of the Prior Art

Most particulate material are heterogenous in nature in that they are comprised of both larger particles and more finely divided, powdery particles in an approximately randomly distributed mixture. Because of this random distribution, however, a mass of particulate material also has homogenous aspects in that two randomly selected equal volumes of uncompacted material should include essentially the same mixture of coarser particles and more finely divided material so that the same mass of material is present in the two volumes. Two major problems occur in volumetrically metering preselected masses of particulate material. First, the material must be placed in a state of uniform compactness so that successive volumetric units metered from a quantity of the material will contain the same mass. Second, the material must be handled prior to volumetric metering in a manner so that the random distribution of coarser and more finely divided material is not disturbed; that is, so that the powdery and granular constituents of the material are not stratified and separated out from one another.

Many prior art metering and dispensing devices have employed various frequencies and amplitudes of vibration in order to feed material from a hopper to a dispensing mechanism. However, a major disadvantage of the use of vibration is that, while rendering masses more able to flow it also causes the particulate material, composed of different sized grains, to suffer stratification. That is, the more finely divided material is lost from the upper layers of material to the lower layers resulting in a concentration of the larger particles in the upper layers. Because of the greater bulk density of small particles of a given material than the larger particles, vibration results in cyclical variations in the rate of dispensing from a container loaded by several serially added batches of material.

Other prior art metering and dispensing devices have employed rotating arms which serve either as spinners, for moving material by centrifugal force, or as movable compartments for confining a particular volume of material between adjacent ones of the arms and then dispensing the confined material. While the present system employs a moving distributor blade it is rotated too slowly to generate any appreciable centrifugal force. Rather the blade is used in a unique fashion to fluidize the material and generate a slowly moving mound of material having fixed geometric characteristics from which a predetermined mass of material is metered.

For certain applications, for example, the metering and mixing of microingredients such as growth stimulants, antibiotics, amino acids, trace minerals and vitamins into animal feed, accuracy is very important. One of the most accurate prior art metering instruments is weigh belts wherein material is dispensed onto a movable belt supported by electrical weight sensors. Other relatively accurate prior art instruments include certain low rate feeders wherein material is dispensed into a groove of known volume cut in the surface of a disc. The material is then struck off level with the surface of the disc leaving a known mass of the material within the groove. In these prior art device, however, a high degree of accuracy is obtainable only over a very small range of values. The system of the present invention is capable of dispensing particulate material with a high degree of accuracy over a wide range of values.

SUMMARY OF THE INVENTION

The invention relates to a method and apparatus for metering particulate material. In accordance with one aspect of the invention, a quantity of particulate material is maintained in a distribution zone defined by a substantially horizontally disposed support surface and a metering surface extending upwardly from the support surface to a metering edge. A mound of particulate material is formed on the support surface adjacent the metering surface such that the natural angle of repose of the mound extends to a level in the plane of the metering surface which is above the metering edge. The mound of particulate material is moved along the metering surface so that particulate material from the mound flows over the metering edge under the action of gravity.

In accordance with another aspect of the invention, the metering system includes a substantially horizontally disposed particulate material support surface and a metering surface extending along and upwardly from the support surface to metering edge. A distributor blade is mounted above the support surface and includes portions extending horizontally adjacent to the support surface and upwardly adjacent to the metering surface. The system includes means for moving the distributor blade along the metering surface to form a moving mound of particulate material characterized by a natural angle of repose extending above the metering surface which is above the metering edge so that particulate material from the mound flows over the metering edge under the action of gravity.

In accordance with still another aspect of the invention a storage hopper having a bottom opening therein contains a mass of the particulate material to be metered. A pressure relief plate having a plurality of holes therein is mounted within and closes the bottom opening in the hopper. An upper orb-sweep is rotatably mounted above the pressure relief plate and includes an upper orb-sweep wire fixed thereto and extending radially outward adjacent the upper surface of the plate. A conical metering hopper is located below the pressure relief plate for collecting material passing through the holes in the plate. The wall of the metering hopper defines a central feeding opening at the bottom. A distributor ring is located beneath the central feeding opening in the metering hopper. The distributor ring comprises a circular substantially horizontally disposed particulate material support surface and a cylindrical metering surface extending around and upwardly from the support surface and having a plurality of port holes formed therethrough. A distributor blade is rotatably mounted within the distributor ring and includes at least one arm extending outwardly above the support surface and then upwardly adjacent the metering surface. A lower orb-sweep wire is fixed to the distributor blade and extends up through the central feeding opening and parallel and adjacent to the inner surface of the metering hopper. The distributor blade and the upper orb-sweep are linked for conjoint rotation. A collecting hopper is located beneath the distributor ring. The system further includes means for rotating the distributor blade to (a) move the upper orbsweep wire adjacent the upper surface of the pressure release plate to fluidize and bottom unload particulate material from the storage hopper through the holes in the pressure release plate and into the metering hopper, (b) move the lower orbsweep wire adjacent the inner surface of the metering hopper to fluidize and bottom unload particulate material through the central feeding opening into the distributor ring, and (c) rotate the distributor blade and move a mound of particulate material along the metering surface of the distributor ring to allow a predetermined fraction of the mound to flow, by gravitation action, through the port holes in the metering surface into the collecting hopper.

BRIEF DESCRIPTION OF THE DRAWINGS

For a more complete understanding of the present invention and for further objects and advantages thereof, reference may now be had to the following description taken in conjunction with the accompanying drawings, in which:

FIG. 1 is a perspective view of the system of the invention within a housing;

FIG. 6 is a cross section view taken along the lines 6—6 of FIG. 2;

FIG. 7 is a top view of a three-armed distributor blade used in the invention;

FIG. 8 is a side view of the distributor blade shown in FIG. 7;

FIG. 9 is a cross section view taken along the lines 9—9 of FIG. 7;

FIG. 10 is a top view of a five-armed distributor blade used in the invention;

FIG. 11 is a top view of an alternate embodiment of a distributor blade used in the invention;

FIG. 12 is a side view of the distributor blade shown in FIG. 11;

FIG. 13 is a diagram of a control circuit used in the invention; and

FIG. 14 is an illustration of the manner in which the lower orb-sweep wire flexes during operation.

DETAILED DESCRIPTION

Figure 2:
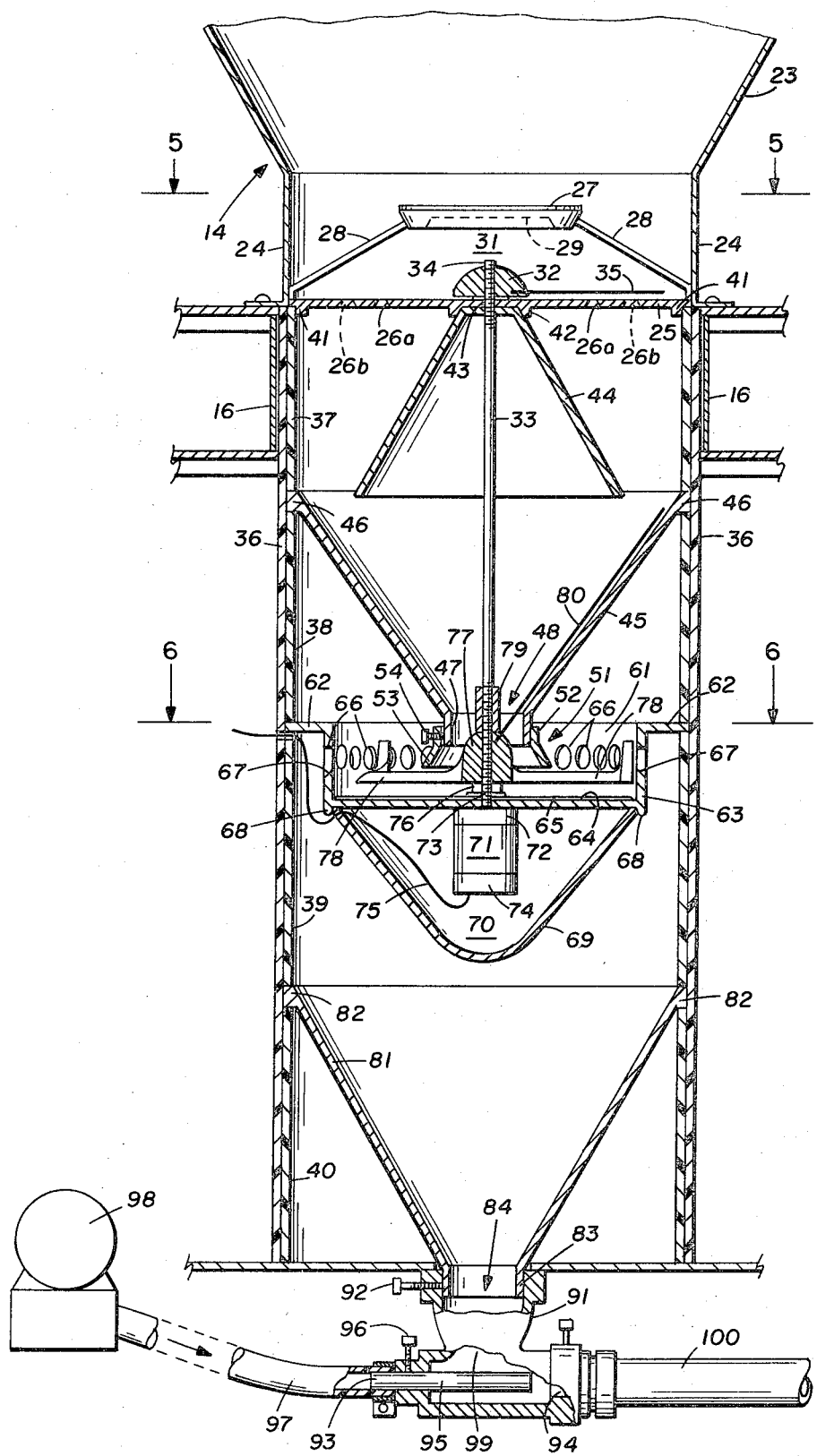
FIG. 2 is a vertical cross section view of the system of the invention.

Referring to FIG. 1, there is shown a perspective view of the system of the invention in a cabinet 11. The cabinet 11 includes a lower enclosure 12 which houses a major portion of the metering mechanism of the invention and an upper enclosure 13 which houses a hopper 14 for storage of the particulate material to be metered. The upper and lower enclosures 12 and 13 are joined by four upstanding legs 15 and a cylindrical cover section 16. The lower enclosure 12 is closed at the front by a hinged door 20 and includes a sampling chamber 17 into which extends a collecting hopper 81 beneath which may be positioned either a sampling container 18 for checking weights of the metered material, or an air entrainment distribution system, as disclosed below. The chamber 17 is closed by a hinged door 19. The upper enclosure 13 is closed at the front by a hinged door 21 and at the top by a hinged upper panel 22 which is raised for filling the hopper 14. When the doors 20 and 21 and the panel 22 are closed and locked, the cabinet 11 completely encloses the system of the invention to prevent unauthorized personnel from tampering with either the internal mechanisms of the system or the material which is being metered. Further, the complete enclosure by cabinet 11 guards against contamination of the material being metered and permits operation under sterile environmental conditions.

Referring to FIG. 2, there is shown a longitudinal cross section view of a system constructed in accordance with the invention. The system includes a hopper 14 comprising inwardly and downwardly extending conical walls 23 which taper down to a short cylindrical section 24 which is connected to the material conditioning section of the present system. The cylindrical section 24 of the hopper 14 is closed at the bottom by a pressure relief plate 25 which includes a plurality of downwardly and outwardly extending conical holes 26a and 26b. Mounted within the cylindrical section 24 is an orb-sweep top pressure plate 27 which is supported on three downwardly extending legs 28. The orb-sweep top pressure plate 27 includes a flat circular top and a central circular recess 29 in the lower surface thereof. Mounted within a generally void area 31 beneath the orb-sweep top pressure plate 27 is a hemispherical upper orb-sweep 32 which is fixed to the end of a centrally extending drive shaft 33. The upper orb-sweep 32 includes a threaded axially extending hole which is received on external threads 34 of the centrally extending drive shaft 33. Mounted to the upper orb-sweep 32 is an upper orb-sweep wire 35 which extends horizontally outwardly beyond the outermost holes 26b in the pressure relief plate 25.

Most of the material conditioning and dispensing apparatus of the present invention is mounted within an outer tubular plastic housing 36, which is cylindrical and formed with smooth internal and external wall surfaces. In one embodiment, a polyvinyl chloride pipe having an outside diameter of 11 ⅝ inches and a wall thickness of one-fourth inch was used to fabricate the outer housing 36. The components of the present system are mounted within the outer housing 36 without means of adhesive or other fastening means. Rather, each of the components is formed so that it is received within the outer housing 36 and is held in position by a plurality of cylindrical spacer sections 37, 38, 39, and 40. Each of the spacer sections is preferably formed from the same material as the outer housing 36 but of a slightly smaller external diameter than the internal diameter of the tubular housing 36 so that the spacers may be slideably received therein.

The pressure relief plate 25 is held centered within a spacer section 37 by a plurality of downwardly extending lugs 41. The pressure relief plate 25 also includes on the lower surface thereof an annular downwardly extending circular ridge 42, centered about a central opening 43, which permits passage of the central drive shaft 33. Mounted against the annular ridge 42 is the top portion of a material diverter cone 44. In one embodiment, the downwardly and outwardly extending walls of the diverter cone 44, lie at a smaller angle of about 59° with the horizontal and extend radially outward beyond the outermost ones of the holes 26b in the pressure relief plate 25. The walls of the material diverter cone 44 extend downwardly to within the walls of a metering hopper 45.

The top of the metering hopper 45 is spaced from the pressure relief plate 25 by the upper spacer section 37 and includes a flange 46 around the outer edges thereof and which is supported by the lower spacer section 38. In one embodiment, the conical walls of the metering hopper 45 extend downwardly and inwardly at a smaller angle of about 59° to the horizontal. The bottom portion of the conical walls of the metering hopper 45 includes a cylindrical section 47 which defines a central feeding opening 48. An adjustable screed ring 51 is attached to the outside of the cylindrical section 47. The screed ring 51 includes a short cylindrical section 52 and a downwardly and outwardly flaring skirt portion 53. The vertical position of the screed ring 51 is adjusted by loosening a set screw 54 and moving the ring up or down on the cylindrical section 46.

A distributor ring 61 is mounted beneath the metering hopper 45 and includes a flat annular flange 62 which is supported upon the spacer section 39. The distributor ring 61 is generally cylindrical with a vertically extending cylindrical wall 63 and a flat circular bottom 64. The bottom 64 is covered with a layer of abrasive material 65. The outer surface of the wall 63 is spaced from the inner wall of the spacer section 39 by the flange 62. As will be disclosed in greater detail below, the distributor ring 61 includes a plurality of circular port holes 66 spaced about a central portion of the wall 63. The lower outer edges of the ports 66 include bevels 67 which provide the ports with sharp lower inner edges.

The lower surface of the distributor ring 61 includes an annular peripheral ridge 68 against the inside surface of which is mounted a dome-like enclosure 69 which forms a drive chamber 70 beneath the distributor ring 61. An electric motor 71 is mounted within the drive chamber 70 and is coupled through a speed reducer 72 to one end of a threaded output shaft 73. A tachometer generator 74 is attached to and driven at the same speed as the motor 71. The power leads for the motor 71 and the output leads from the tachometer 74 are contained with a cable 75 which extends to external circuitry through a sealed opening in the enclosure 69 and openings in the walls of the spacer 39 and the outer housing 36.

The output shaft 73 passes through an opening in the bottom of the distributor ring 61 and through a bushing 76 within the ring. A distributor blade 77, having a plurality of curved outwardly extending arms 78, is threadedly attached to the end of the output shaft 73. The centrally extending drive shaft 33 is coupled to the end of the output shaft 73 by means of an internally threaded coupling sleeve 79. A lower orb-sweep wire 80 is mounted in a socket formed in the top of the distributor blade 77 and extends up through the central feeding opening 48 in the bottom of the metering hopper 45 and along and adjacent to the inner surface of the metering hopper walls.

As seen in FIG. 2, the outer surface of the wall 63 of the distributor ring 61 is spaced from the inner surface of the spacer section 39 so that particulate material passing the distributor ring and out the ports 66 will fall into a collecting hopper 81. The inside surface of the spacer section 39 is preferably covered with a layer of polished aluminum foil, approximately 10 mils thick, to dispense any static charges and prevent the adherence of particles passing through the port holes 66.

The walls of the collecting hopper 81 are conical and include a flange 82 around the upper periphery which is supported between the lower spacer section 39 and the bottom spacer section 40. The bottom portion of the collecting hopper 81 includes a short cylindrical section 83 which defines an outlet opening 84 to collect the particulate material metered through the system of the present invention, as shown in FIG. 1. Alternatively, the present metering system may include an air entrainment distribution system which includes a venturi housing 91 connected to the cylindrical section 83 by means of a set screw 92. The venturi housing 91 includes an inlet opening 93 and an outlet opening 94. A venturi tube 95 is slideably mounted within the inlet opening 93 by means of a set screw 96. The inlet opening 93 is connected through a tube 97 to a supply of moving air, such as a blower 98. Movement of the air from the blower 98 through the tube 97 and out the venturi tube 95 creates a reduced pressure in the region 99 which draws material from the hopper 81, entrains the material in a flow of air, and moves the material through the outlet opening 94 into a distribution line 100. The distribution line 100 may lead to an external hopper (not shown) into which the metered material is to be mixed or, instead, it may lead into a mixing tube (not shown) for transporting an entrained mass of particles into which the metered material is to be mixed.

The pneumatic system for distributing the particulate material output from the collecting hopper 81 is spaced below the distributor ring 61 to allow for prebatching of metered amounts of material into the hopper prior to removal of material therefrom. In this manner, the system can be operated to cycle and deliver a metered amount of material into the collecting hopper 81. When the addition of this metered quantity of material to a mix is called for, only the blower 98 need be operated in order to remove the material to a remotely located mixing chamber via the distribution line 100. In one embodiment, a blower such as the Model 8700 blower manufactured by the Brever Manufacturing Co. of Chicago, Illinois, was used which delivered 53 cubic feet per minute of air per minute.

In one embodiment, the following components of the system of the invention were formed of cast aluminum: orb-sweep top pressure plate 27, upper orb-sweep 32, material diverter cone 44, metering hopper 45, screed ring 51, distributor ring 66, distributor blade 77, enclosure 69, collecting hopper 81 and venturi housing 91. For embodiments of the invention which are used to process particulate materials under sterile conditions, the components may be coated or plated with an outer covering of an inert material such as polyvinylchloride, Teflon, etc.

Figure 5:
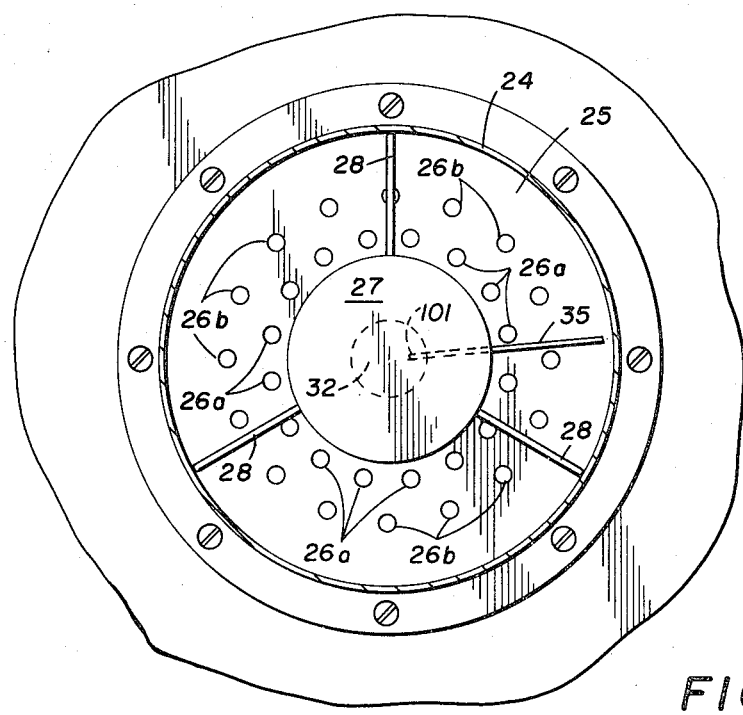
FIG. 5 is a cross section view taken along the lines of 5—5 of FIG. 2.

Referring now to FIG. 5, the pressure relief plate 25 is circular and includes an inner annular array of 16 circular holes 26a. The center of each of the holes 26a is equally spaced from the center of the plate 25 and each lies on an inner common circle. The plate 25 also includes an outer annular array of circular holes 26b. The center of each of the outer holes 26b is also equally spaced from the center of the plate and lie on an outer common circle. The center of each of the outer holes 26b is located on a radial line which extends from the center of the plate and passes half way between adjacent ones of the inner holes 26b. The size of the holes 26a and 26b is determined by the density and character of the material to be metered, as well as the desired flow rate of material through the system.

The orb-sweep top pressure plate 27 is mounted on the three radially extending legs 28 and overlies the upper orb-sweep 32. The upper orb-sweep wire 35 is mounted within a socket 101 and extends radially outward beyond the outermost ring of holes 26b. The upper orb-sweep wire 35 is preferably constructed of spring carbon steel wire, and, in one embodiment, a diameter of 0.075 inch proved to operate satisfactorily. If a considerably larger diameter of wire is used, there is too much resistance to movement within the particulate material which leads to loading of the driving motor and possible breakage of the wire. If a considerably smaller diameter wire is used the resistance of the particulate material as the wire is passed therethrough leads to plastic deformation and permanent distortion of the wire.

As best shown in FIG. 2, the lower surfaces of the holes 26a and 26b are beveled outwardly at an angle of about 32° with the horizontal top surface of the plate. It is through the holes 26a and 26b that the first metering action occurs and which relieves the compacting pressure on the particulate material by aerating and fluidizing it. Material is metered through the pressure relief plate 25 by the rotation of the upper orb-sweep 32 so that the orb-sweep wire 35 moves in a circular pattern, first passing over one of the holes 26a on the inner array, through the space between the holes and then passing over one of the holes 26b in the outer array. This action produces a constant feed of material through the pressure relief plate and avoids pulsation and intermittent feeding action which leads to increased pressures on the material fed through the plate.

As the material passes through the holes 26a and 26b, it strikes the outer surface of the material diverter cone 44 and is deflected into the metering hopper 45. When the system is operating so that it is filled with material being metered, there is a void area within the interior of the diverter cone 44 and a void area directly beneath the lower surface of the plate 25 and outside the outermost ring of holes. The void areas provide pressure relief to reduce compaction of the particles to be metered. Since the sides of the diverter cone 44 extend radially outward past the outermost ring of holes 26b, the weight of the vertical columns of material passing through the holes 26a and 26b, is supported by the material diverter cone 44, rather than packing the mass of material within the metering hopper 45.

One of the features of the present invention is that the material to be metered is bottom unloaded from the hopper 14 so that all of the material in the hopper tends to remain at the same level and move as a unit vertically downward as material is unloaded. Bottom unloading eliminates the formation of a vortical void space extending centrally downward from the top surface of the material within the hopper. Bottom unloading enables the material to move downwardly in a flat plane without permitting coning action, i.e., formation of a vortical opening, which in turn leads to separation of the material into coarser and more finely divided particles. The bottom unloading effectively "cuts off" the material in slices without disturbing the original mixture among coarser and finer materials. Unloading in the present system is also accomplished with a minimum of vibration. Vibration tends to cause the more finely divided particles to settle out against the walls of the container and separate the material into different densities. The orb-sweep top pressure plate 27 functions to support the weight of the material in the hopper above and to relieve pressure from the upper orb-sweep 32. This pressure relief serves to (1) reduce the pressure on the material to be metered and as the material particles fall over the sides of the plate 27 tends to aerate and fluidize the material and (2) reduce the torque requirements of the motor 71 to drive the upper orb-sweep. The function of the pressure relief plate 25 is that of conditioning the material to relieve any compaction due to the weight of the material in the hopper by aerating the particles and fluidizing the material as it passes through the openings 26a and 26b in the plate.

As shown in FIG. 2, the lower orb-sweep wire 80 is mounted in a socket formed in the hub portion of the distributor blade 77. The wire 80 extends from the distributor blade 77, up through the central feeding opening 48 and along the inner surface of the metering hopper 45 to just below the top of the hopper. The wire is preferably made of a resilient, flexible wire and in one embodiment a piece of tinned music wire having a diameter on the order of 0.075 inches worked satisfactorily. Rotation of the distributor blade 77 moves the wire 80 around the inner periphery of the hopper 45. When the distributor blade 77 is rotated and the metering hopper 45 is filled with particulate material the orb-sweep wire 80 is pressed against the inner wall of the hopper and is flexed rearwardly in an arcuate path. As the orb-sweep wire 80 moves through the resistance of the material in the hopper 45, the arcuate flexure of the wire produces a consistent jerking motion which loosens and fluidizes the material adjacent the wall of the hopper without vibrating the mass of the material in the hopper. The orb-sweep wire 80 quivers and jerks along to "cut" through the particulate material rather than force its way. This motion gently vibrates and loosens the material near the wall of the hopper 45 so that after the wire passes through a region the particles settle back to a location near their original position before the wire passed. And, because some material is being fed out through the central feeding opening 48, the particles generally settle to a position lower down in the hopper 45 than before the wire passed.

The intermittent movement of the lower orb-sweep wire 80 through the particulate material around the inner periphery of the hopper 45 may be characterized as a "murmur vibration." Murmur vibration is intended to describe the faint rhythmic jerking motion of the wire 80 which results from the periodic pulsating release of flexure tension in the wire due to settlement and readjustment of particle positions. The jiggling action of the wire creates a smooth rhythmic cutting motion which allows the particles to follow a path of least resistance and fluidizes and loosens up the material for movement uniformly downward.

To generate murmur vibration the angle of the orb-sweep wire 80 with respect to its general direction of movement through the material must be such that a path is cut through the material rather than being forced, as illustrated in FIG. 14. When the wire 80 flexes it decreases the unit area of resistance presented by the material to be passed through by the wire. When the material particles give and move around the wire, the flexure tension is released slightly and the wire jerks forward. When the wire jerks forward it increases its "angle of attack" and increases the unit area of resistance so that the wire is again flexed in a repetitive cycle. In an alternate embodiment, a small tab or hook is placed at the upper end of the wire 80 to further increase the resistance of the wire within the material, and hence, its angle of flexure.

The end result of the murmur vibrations in the orb-sweep wire 80 is that the particulate material in the metering hopper 45 bottom unloads from the central feeding opening 48 so that the mass of material moves uniformly downwardly in generally fixed horizontal planes. In the present system of feeding particulate material through the metering hopper 45, there is no vortical void in the center of the hopper 45 nor is any vibration transmitted to the mass of material within the hopper 45 which could lead to stratification of the material into coarser and finer particles. Having both of the upper and lower orb-sweeps fixed for rotation with a common drive shaft provides that particulate material is fed into and through the various stages of the system at the same rate it is being taken out of those stages.

Figure 3:
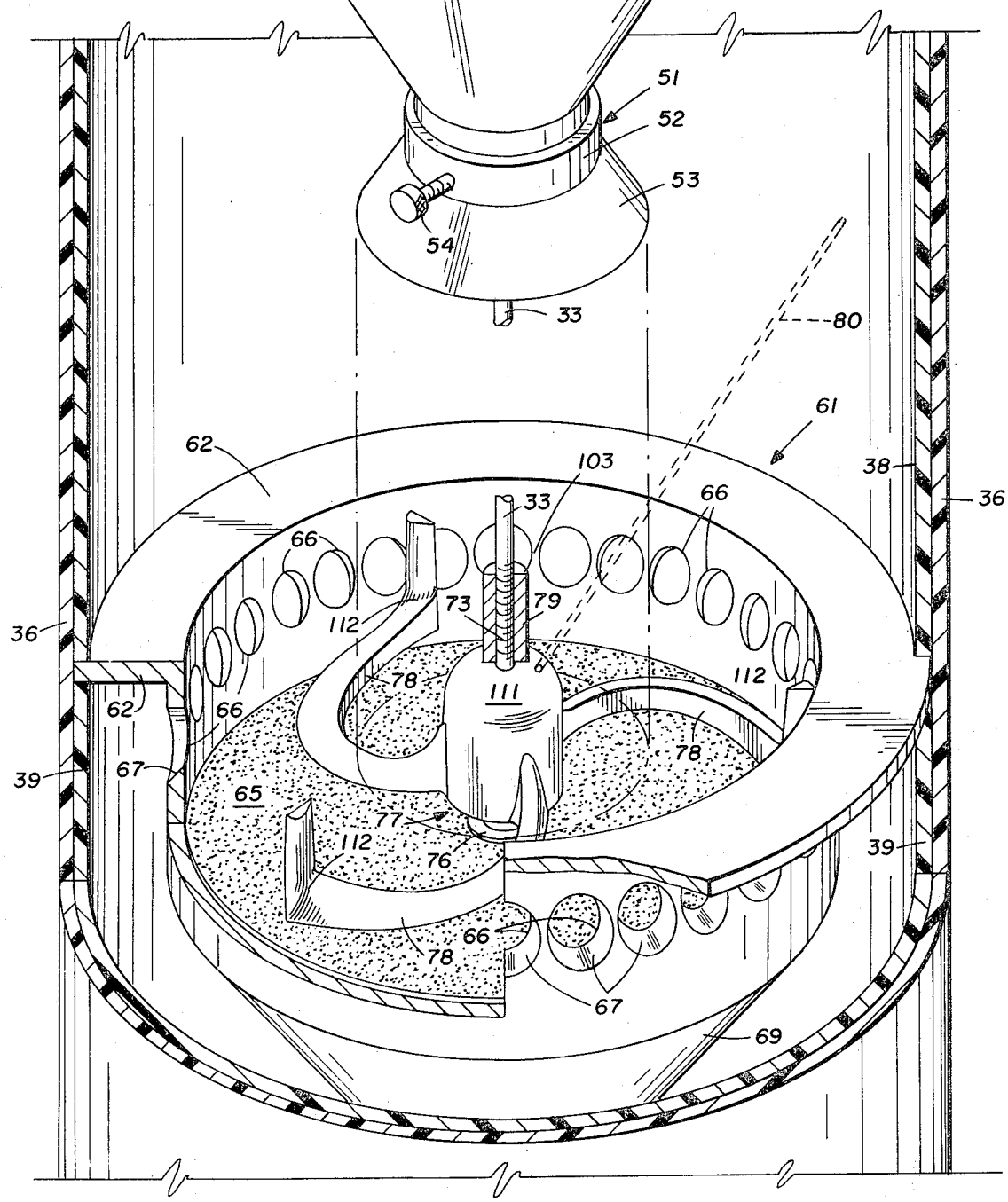
FIG. 3 is a partially cutaway perspective view of the distributor ring and metering hopper used in the invention with the hopper exploded away from the ring.
Figure 4:
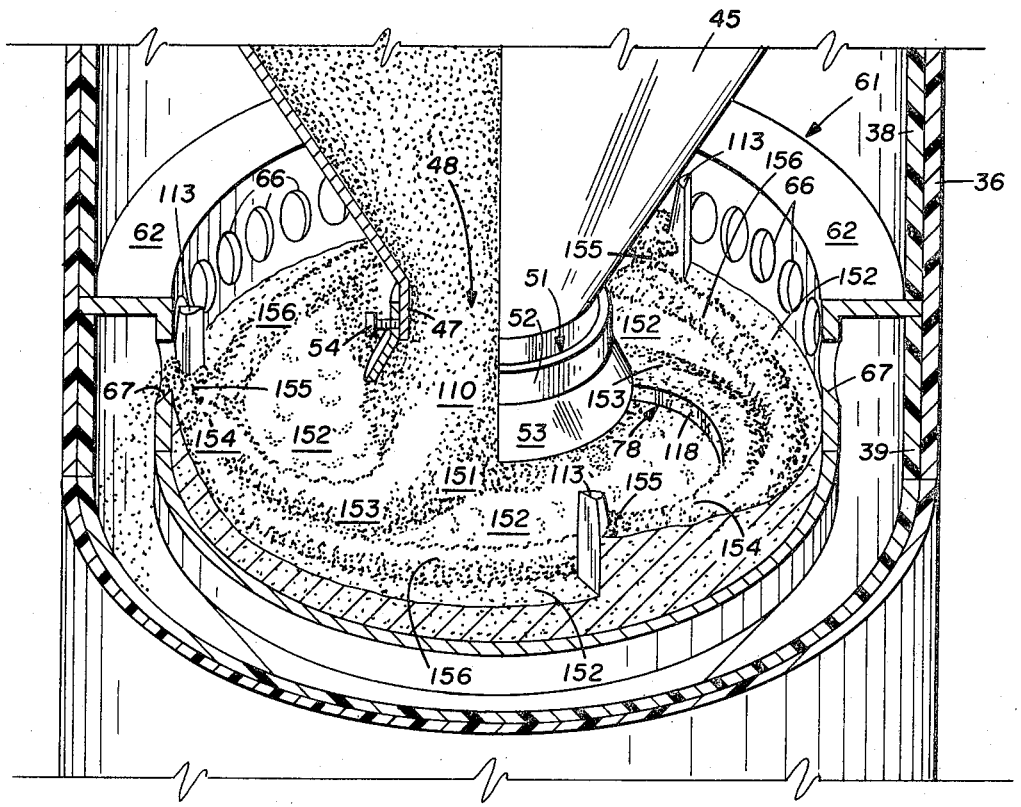
FIG. 4 is a partially cutaway perspective view of the distributor ring and metering hopper used in the invention showing the flow of particulate material therethrough.

Referring now to FIGS. 2—4, it can be seen how the adjustable screed ring 51 is positioned surrounding the opening 48 just above the arms 78 of the distributor blade 77. The function of the outwardly flaring skirt portion 53 of the screed ring 51 is to resist the tendency of the particulate material 110 (FIG. 4) to spread out at the angle of repose after passing through the opening 48. The screed ring 51 shapes the outflow of material from the metering hopper 45 by choking the outwardly directed movement of the particles. The vertical position of the bottom edge of the screed ring 51 is adjustable in order to change the rate of flow of material from the metering hopper 45 into the distributor ring 61. In effect, the screed ring 51 measures out material from the metering hopper 45 while the arms 78 of the distributor blade 77 measure material from within the screed ring 51 outwardly into the distributor ring 61. The screed ring 51 feeds particulate material into the distributor ring 61 only as it is required by the arms 78, which is in direct proportion to the speed of rotation of the distributor blade 77. For maximum accuracy, the lower edge of the screed ring 51 is located as close as possible to the tops of the distributor blade arms 78. In one embodiment, a clearance distance between the bottom edge of the screed ring and the tops of the distributor blade arms of from about one-eighth to about one-sixteenth inch provided a high degree of accuracy in resultant metering.

Referring now the the partially cut away perspective view of the distributor ring 61 shown in FIG. 3, the metering hopper 45 is shown exploded vertically away from the distributor blade 77. The circular bottom surface of the distributor ring 61 is covered with a layer of abrasive material 65 to prevent the entire mass of material contained within the distributor ring from moving in a circle by sliding on the bottom surface. In one embodiment, the material used for layer 61 was SAFETY WALK PAPER, Type B, medium grit, manufactured by the Minnesota Mining and Manufacturing Company.

The distributor blade 77 includes a spindle portion 111 which is threadedly attached to the output shaft 73 above the bushing 76. The bottom edges of the distributor blade arms 78 are spaced from the surface of the abrasive material 65 to allow small foreign objects which might be within the material to be metered, to sink to the bottom and prevent damage to the port holes 66. The distributor blade 77 is positioned within the distributor ring 61 so that the tops of the fillets 112 near the ends of the arms 78 are located at approximately the bottom edges of the port holes 66.

As shown in FIG. 3, the port holes 66 are spaced from one another so that the fillets 103 between the port holes 66 are relatively narrow to give good repeatability of flow from the holes when the distributor blade 77 is started and stopped at various positions around the distributor ring 61. The lower edges of the outside portions of the port holes 66 are formed with bevels 67 so that the lower insides of the holes (looking out) include a sharp, knife-like lower edge. The bevels 67 prevent the accumulation of particles of material within the holes 66 and thereby avoid metering inaccuracies due to material dribble from the holes after motion of the distributor blade 77 has stopped. The number and size of the holes 66 is proportional to the diameter of the distributor ring being employed. In one embodiment, for example, a distributor ring having an inside diameter of 12 inches successfully employed port holes having a diameter of about 27/32 inch.

Referring now to FIGS. 7 and 8, there are shown, respectively, top and side views of a distributor blade 77. The blade 77 includes a dome portion 111 and three curved radially extending arms 78. Each arm 78 is terminated by a vertically extending riser portion 113 adjacent the fillet 112. Each of the arms 78 of the distributor blade 77 features a rounded, air-foil like leading surface 115 with a sharp leading edge 116 to get beneath particulate material and lift it up over the arm. The trailing edge 117 of each of arms 78 includes a flat vertically extending face 118, best seen in FIG. 9. The face 118 provides a drop-off so that particulate material passing over the arm, in the direction of arrow 119, will fall from the top of the arm and be further aerated and fluidized.

The cross sectional areas of the blade arms 78 are smaller closer to the dome portion 111 in order to better move material from within the screed ring 51 (FIG. 4) out into the distributor ring 61 and to precondition the material prior to delivery through the port holes. The cross sectional areas of the blade arms 78 are larger toward the ends of the arms in order to efficiently move the material within the distributor ring toward the port holes for delivery.

In FIG. 10 there is shown an alternate embodiment of a distributor blade 121 having a dome portion 122 and five curved, radially extending arms 123. The structure of each arm 123 is identical to that of the arms 78 of the distributor blade 77, shown in FIG. 7. In the present metering system the amount of particulate material delivered is directly proportional to the number of arms per blade and to the rotational velocity of the blade. Moreover, the larger the diameter of the distributor ring the more arms the distributor blade may have and, hence, the greater the quantity of material which can be metered and delivered per revolution of the blade.

FIGS. 11 and 12 show, respectively, top and side views of a further alternate embodiment of a distributor blade 131 which has proven to operate satisfactorily. The blade 131 includes a spherical dome portion 132 having a threaded aperture 133 therethrough with a cylindrical recess 134 at the bottom to receive the bushing 76 (FIG. 2). The blade 131 includes two curved, radially extending arms 135 which are each formed from a rod having a circular cross section and which is bent back upon itself into the configuration shown. Each arm 135 comprises a lower, material contacting portion 136, an upstanding riser section 137 at the end, and an upper support portion 138. When the blade 131 is in use within a distributor ring, the lower material contacting portions 136 and the riser portions 137 function, respectively, in the same manner as the surfaces 115 and riser portions 113 of the blade 77, shown in FIGS. 7 and 8. The portions 138 of the arms 135 (FIGS. 11 and 12) only serve to provide support and stability to the arms with particulate material being free to pass through the spaces 139. The distributor blade 131, of FIGS. 11 and 12, provides a symmetrical flow of particulate material and aerates the material as it passes across the surfaces of the material contacting portions 136.

Each of the distributor blade is designed to create an overflow of particulate material across the tops of the arms to precondition the material by aerating and fluidizing the particles. In the distributor ring, the particulate material is permitted to follow a path of least resistance over the arms of the rotating distributor blade in order to avoid packing or compression of the particles against any abutment such as the inside surface of the outer perimeter of the distributor ring. In considering the actual volumetric metering of particulate material from the distributor ring by the distributor blade, reference is made to FIGS. 4 and 6. One of the primary functions of the distributor blade is to aerate and fluidize the material within the distributor ring so that the material is placed in its lowest state of compaction immediately prior to metering the material out of the distributor ring.

Referring first to FIG. 4, there is shown a partially cut away perspective view of the distributor ring 61, charged with particulate material 110. The distributor blade, within the ring 61, is shown during operation wherein the particulate material is further conditioned and then metered out through the port holes 66. There is some degree of uncertainty as to exactly what movements the particles comprising the mass of particulate material undergo as the distributor blade arms 78 move orbitally about the distributor ring 61. One explanation is that the particles move generally in a vertical direction, much like a wave in liquid, and the arms 78 pass beneath the particles. Another explanation is that there is longitudinal movement of the particles as they are "pushed" in a mound ahead of the arms. Most likely, particle motion is a combination of these two possibilities. Thus, whereas the following discussion is worded in terms of moving a mound of material ahead of a moving arm surface, it is intended to also cover formation of a "wave" as the arm moves beneath the material.

The rotation of the distributor blade arms 78, in a range of about 1–6 R.P.M., moves particulate material from beneath the screed ring skirt 53, as at location 151. A generally flat support surface region 152 is defined on the particulate material within the ring 61 by passage of the bottom surface of each of the distributor blade arms 78. As the blade arms 78 continue to rotate, a moving mound of material is formed in regions 153 in front of and above the leading surface 115 (FIG. 9) of the blade arms. A portion of the moving mound of particulate material in regions 153 is aerated by tumbling and "boiling" along it that when the mound becomes large enough that the angles of repose of the material is exceeded, some of the particles tumble forward back to the surface region 152 and are picked up again by the mound as it moves forward. Another portion of the particulate material comprising the moving mound in regions 153 is aerated by moving across the upper surface of the arms 78 and falling over the backs of the arms, across the vertical faces 118, to the surface region 152 defined by passage of the arm. The particles of material which fall over the back of one arm are picked up by and become part of the moving mound of material, in region 153, in front of the next blade arm to come along.

As material is moved along ahead of the rotating arms 78, in regions 153, the material also moves radially outward into distribution regions 154 which are moving mounds of particulate material lying at the natural angle of repose generally ahead of the riser portions 113. The mounds of particulate material in the distribution regions 154 move above the support surface 152 and adjacent a metering surface, defined by the cylindrical wall 63, and along a metering edge, defined by the sharp bottom edge of the port holes 66. By the time material moves radilly outward far enough to become part of the distribution regions 154 it has been thoroughly aerated and fluidized by movement in front of and over the arms 78 so that it is in a highly uncompacted state. The material in the distribution regions 154 is formed ahead of the riser portions 113 with all material greater than that necessary to form a constant volume of material with fixed geometric characteristics being allowed to overflow the arms 78. Excess material flows around the inside edges of the riser portions 113, above the fillets 112 (FIG. 3), and through excess discharge regions 155 to form elongate ridges 156 of thoroughly aerated and fluidized particles trailing behind the arms. The ridges of material 156 are comprised of uncompacted particles lying at the angle of repose of the particulate material and include rounded upper surfaces of generally uniform height and width.

As the arms 78 continue to rotate each of the ridges 156 are picked up by and become part of the distribution region 154 ahead of the riser portion 113 which is immediately behind the riser portion which formed the ridge. The highly uncompacted material picked up by a moving distribution region 154, from a ridge 156, generally forms the upper most material of that distribution region. Each of the distribution regions 154 comprises a constant volume of uniformly uncompacted particulate material and as the regions move about the periphery of the distributor ring 61, the material adjacent the port holes 66, and above the lower metering edges thereof, flows by gravitational action out of the ring and falls into the collecting hopper 81. The amount of material which is metered through the port holes 66 is determined and limited by the angle of repose of the material. That is, the depth of the mound of material forming a distribution region 154 is great enough that the natural angle of repose causes the surface of the mound to extend to a level, in the plane of the metering surface, which is above the metering edge, defined by the bottom edges of the port holes 66. Thus, when the regions 154 are adjacent the holes, a fractional volume of the mound of material, containing a predetermined mass of material, flows by gravitational action from the mound and out through each hole. The flow through the holes 66 is due only to gravity and th particulate material is never "pushed" or forced to move in any direction so that there are no forces which would tend to compact the particles. The material is metered out through the holes 66 at a uniform rate which is directly proportional to the speed of rotation of the distributor blade 66.

Referring now to FIG. 13, there is shown a diagram of the electrical control circuitry used in the system of the invention. An a.c. power source 201 is connected through a master cut-off switch 202 and an empty cut-off relay 203 to a power supply 204. The circuitry includes a photo-electric subsystem for detecting an empty condition in the system which includes a pair of transparent windows 205 and 206 located in the walls of the housing just below the pressure release plate (FIG. 2). A light source 207 is located behind the window 205 to project a beam of light into the housing. If the level of particulate material within the system drops below the window 206, light passes through the window and strikes a photo-detector 208 which is connected to a control circuit 209. When light impinges upon the photo-detector 208, the control circuit 209 operates the empty cut-off relay 203 to interrupt power to the system and at the same time illuminate an empty indicator lamp 211.

The power supply 204 produces a 14 volt d.c. output onto leads 212 which pass through a motor control relay 213 to drive the d.c. motor 71. The motor 71 operates through the speed reducer 72 to drive the output shaft 73. In one embodiment, a motor 71 manufactured by Barber-Coleman Inc. of Rockford, Illinois, was used which operates at a maximum variable speed of 4,200 R.P.M. The motor was operated thorugh a 750:1 speed reduer for an output shaft 73 speed in the range of about one-half to 6 R.P.M. and an output torque of 25 inch-pounds. The motor used was a constant torque, variable speed motor which drew 0.25 amps at no load and 0.3 amps at full load.

The motor 71 is connected to a motor speed adjustment reostat 214 to control the speed of the output shaft 73 in a range of from about one-half to 6 R.P.M. The motor 71 includes a builtin tachometer generator 74, the output of which is connected through a frequency multiplier 215 to a counter 216. The counter 216 includes an electronic digital display of the count therein which, after calibration for density, is equal to the mass of material delivered, in grams. The relay 213 is connected to an adjustable timer 217 which precisely controls the time interval during which the motor 71 is to be driven.

Prior to operation of the system it must first be charged and then calibrated for the density of the particular material to be metered. To calibrate the circuitry of FIG. 12, the adjustable timer 217 is set, for example, for a 1 minute period of operation. The motor speed adjustment 214 is set to a selected motor speed. The master control switch 202 is closed and the motor 71 is operated for the selected time period of one minute at the selected R.P.M. When the period of operation is finished, the quantity of material delivered is weighed. The frequency multiplier 215 is then adjusted until the output of the digital counter 216 is equal to the weight of the product metered during the period of operation. The dispensing, weighing and adjustment steps may be repeated several times to insure accuracy. The system is now calibrated for the particular density of material therein so that when the switch 202 is again closed to begin operation the digital counter 216 will display an output which is equal to the number of grams which is delivered, to within ± 0.25–1.0 percent accuracy.

Where the term "particulate material" is used herein, it is in the broad sense including solid materials comprised of discrete particles as opposed to liquids. The system of the invention has successfully metered many different and varied materails to better than ± 0.25 percent accuracy over a range of from a few grams to several pounds. Examples of a few of the particulate materials successfully metered and their physical characteristics as shown in TABLE I, below:

TABLE I

| Material | Diameter Range of Solid Particles in inches | Color of Material | Physical Characteristics |
| --- | --- | --- | --- |
| Ground Dried Molasses | 0.1–0.005 | dark brown | rock-like agglomerates & individual particles |
| Cattle Salt | 0.15–0.001 | grey | individual crystals & agglomerates |
| Aureomycin Supplement S-700 | 0.05–0.001 | dark grey | amorphous agglomerates & individual particles |

As can be seen, the particulate material may be amorphous as well as crystalline in structure and includes materials having particles at least as small as 1/1000 inch in diameter, as in the case of the Aureomycin Supplement S-700.

Referring to FIG. 2, the system operates as follows. A quantity of the particulate material to be metered is placed in the hopper 14. When the material is added, a portion of the weight of the material is supported by the orb-sweep top pressure plate 27 located above the upper orb-sweep 32. The material flows around the plate 27 and covers the upper surface of the pressure relief plate 25. When the motor 71 is energized, rotation of the output shaft 73 rotates the centrally extending drive shaft 33. Rotation of the shaft 33 rotates the upper orb-sweep 32 and moves the upper orb-sweep wire 35 in a circular pattern above the surface of the pressure relief plate 25. Movement of the wire 35 meters a small amount of material through each of the holes 26a and 26b so that the particles trickle down through the pressure relief plate 25 onto the outer surface of the material diverter cone 44 and into the metering hopper 45.

Rotation of the distributor blade 77 moves the lower orb-sweep wire 80 in a circular pattern about the inner periphery of the metering hopper 45. The particulate material moves downwardly out of the metering hopper 45, through the central feeding opening 48, through the screed ring 51, into the distributor ring 61. When the system is being initially charged with material, the particles flow into the distributor ring 61 to the top of the skirt portion 55 of the screed ring 51. As the distributor blade arms 78 rotate about the distributor ring 61, they move material from within the screed ring 51 and distribute it about the distributor ring 61. Material continues to flow into and fill the metering hopper up to the lower surface of the pressure relief plate 25. In initially charging the system with material and hopper 14 is preferably filled only about one-third full and the system operated until the "empty light" 211 (FIG. 13) goes off. The hopper 14 is then filled completely and the system calibrated for the density of the particulate material being metered, as disclosed above.

After charging, and the metering hopper 45 is full, the lower orb-sweep wire 80 moves about the inside periphery of the metering hopper 45 so that the material is gently agitated to bottom feed through the opening 48 into the area of the distributor ring 61 within the skirt portion 53 of the screed ring 51. Particulate material is moved from beneath the screed ring 51 by the rotating arms 78 of the distributor blade 77. The actual metering action of the distributor blade 77 within the distributor ring 61 is best shown and described in connection with FIGS. 4 and 6, above. In general, the arms 78 of the distributor blade aerate and fluidize the particulate material and move uncompacted material out through the port holes 66 into the collecting hopper 81, at a highly accurate, constant mass flow per unit of time. The mass delivered per minute is directly related to the number of distributor blade arms 78 and the number of revolutions per minute of the distributor blade 77.

From the above detailed description it can be seen how the system of the invention preconditions the particulate material to be metered by aerating and fluidizing it into a uniformly uncompacted state prior to volumetric metering. Preconditioning the material, while simultaneously minimizing vibration thereof, and then forming the material into moving mounds from which fractional volumes are removed by gravitational action enables the system of the invention to meter material with a high degree of accuracy over a wide range of flow rates.

Having described the invention in connection with certain specific embodiments thereof, it is to be understood that further modifications may now suggest themselves to those skilled in the art and it is intended to cover such modifications as fall within the scope of the appended claims.

What is claimed is:

1. A particulate material metering process comprising:
   maintaining a substantially constant quantity of particulate material in a metering zone defined by a substantially horizontally disposed support surface and a metering surface extending upwardly from the support surface to a metering edge;
   forming a generally uniform mound of particulate material above the support surface and engaging the metering surface, said mound having an upper surface extending in accordance with the natural angle of repose of the particulate material to a level in the plane of the metering surface with is above the metering edge; and
   moving the mound of particulate material with a rotating blade radially outward along the metering surface so that particulate material from the top of the mound flows over the metering edge under the action of gravity.

2. A particulate material metering process as set forth in claim 1 which also includes the additional step of:
   aerating and fluidizing the particulate material to place it in a state of low compaction prior to maintaining the material in the metering zone.

3. A particulate material metering process as set forth in claim 1 which includes the additional step of:
   storing a quantity of the material to be metered in a hopper; and
   feeding material from the storage hopper into the metering zone.

4. A particulate material metering process as set forth in claim 1 which includes the additional step of:
   catching the particulate material which flows over the metering edge in a collection hopper.

5. A particulate material metering process as set forth in claim 4 which includes the additional steps of:
   entraining the particulate material caught in the collection hopper in a flow of air; and
   transferring the entrained particulate material to a remote location.

6. A method for accurately metering a defined mass of particulate material into a collecting hopper, comprising:
   aerating and fluidizing the particulate material while simultaneously minimizing vibration thereof to place said material in an unstratified state of low compaction;
   feeding said material into a metering zone;
   aerating and fluidizing said material within said metering zone and moving said material radially outward by a barrier member, simultaneously forming a uniformly compacted mound of particulate material having a fixed geometric configuration characterized by the natural angle of repose of the particulate material;
   defining a fractional volume of said mound containing a predetermined mass of material; and
   allowing said fractional volume of material to flow by gravitational action from the top of said mound and thereby metering a defined mass of material into said collecting hopper.

7. A method for accurately metering a defined mass of particulate material into a collecting hopper as set forth in claim 6 wherein the first aerating and fluidizing step includes:
passing the particulate material through an apertured plate; and
collecting the particulate material passing through the apertures in the plate in a conical metering hopper.

8. A method for accurately metering a defined mass of particulate material into a collecting hopper as set forth in claim 7 wherein the feeding step includes:
gently agitating the collected particulate material in a narrow region adjacent the conical wall of the metering hopper to bottom unload material from the metering hopper into the metering zone.

9. A method for accurately metering a defined mass of particulate material into a collecting hopper as set forth in claim 6 wherein the forming step includes:
permitting particulate material to flow freely over and around said moving barrier member and leaving a mound of material having a fixed geometric configuration ahead of said moving barrier.

10. A method for accurately metering a defined mass of particulate material into a collecting hopper as set forth in claim 9 wherein said defining step includes:
moving the barrier member adjacent to a vertically extending metering surface having a metering edge at the top to form a mound of particulate material characterized by a natural angle of repose extending to a level on the metering surface above the metering edge, said frictional volume of said mound being that material lying above a surface parallel to the natural angle of repose and passing through the metering edge.

11. A process for metering particulate material including the steps of:
bottom unloading particulate material from a hopper into a particulate material aeration and fluidization zone;
aerating and fluidizing the particulate material within the aeration and fluidization zone so that the mass of particulate material per unit of volume is substantially constant throughout the aeration and fluidization zone;
bottom unloading particulate material out of the aeration and fluidization zone into a metering zone comprising a support surface and a metering surface extending upwardly from the support surface and having a plurality of particulate material discharge ports formed through it at a predetermined height above the support surface;
forming a mound of particulate material on the support surface in the metering zone characterized by an upper surface extending at the natural angle of repose of the particulate material to a level on the metering surface which is above the particulate material discharge ports formed therein; and
moving the mound of particulate material radially outward by a rotating blade around the metering surface in the metering zone so that particulate material from the top of the mound continuously flows out through the particulate material discharge ports in the metering surface under the action of gravity.

12. A process for metering particulate material as set forth in claim 11 wherein the aeration and fluidization step includes:
passing the particulate material, in free fall, through an open space;
catching the falling particulate material within a conical metering hopper;
gently agitating the particulate material in the region adjacent to the inner wall of the metering hopper.

13. A process for metering particulate material as set forth in claim 12 wherein the agitation step includes:
moving an elongate flexible member about the surface of the inner wall of the metering hopper.

14. A process for metering particulate material as set forth in claim 11 which also includes the steps of:
catching the particulate material flowing out through the discharge ports in a collection hopper;
entraining the particulate material caught in the collection hopper in a flow of air;
transporting the entrained particulate material to a remote location.

15. A process for metering particulate material as set forth in claim 11 wherein the forming step includes:
allowing all particulate material in excess of a predetermined quantity to flow from the mound onto the support surface under the action of gravity.

16. A process for metering particulate material comprising:
bottom feeding particulate material from a hopper into a first aeration and fluidization zone comprising a substantially horizontally disposed plate having a plurality of outlet holes formed therethrough;

rotating a first thin, elongate member in the first aeration and fluidization zone at a level just above the plate to aerate and agitate the particulate material therein and to feed the material out of the first aeration and fluidization zone through the holes in the plate;
receiving particulate material from the first aeration and fluidization zone in a second aeration and fluidization zone comprising an upper outwardly and downwardly tapered conical member and a lower inwardly and downwardly tapered conical member surrounding the lower end of the upper conical member to define an annular opening therebetween;
aerating and fluidizing the particulate material in the second aeration and fluidization chamber by rotating a second thin, elongate member in the second chamber along a path extending adjacent to the inner surface of the lower conical member;
receiving particulate material from the second aeration and fluidization chamber in a metering chamber comprising a substantially horizontal support member and a metering wall extending upwardly from the support member and having a plurality of metering holes formed therethrough; rotating a distributor blade comprising at least one arm extending outwardly over the support surface to a point adjacent the metering wall and then upwardly adjacent the wall to aerate and fluidize the particulate material in the metering chamber and to form a radially outwardly traveling mound of particulate material characterized by an upper surface extending at the natural angle of repose of the particulate material to a point on the metering wall above the level of the metering holes therein, whereby particulate material from the mound flows from the top of the traveling mound through the metering holes in the metering wall of the metering chamber under the action of gravity as the mound moves along the metering wall ahead of the traveling arm.

17. A process for metering particulate material as set forth in claim 16 wherein said first and second thin elongate members and said distributor blade are all rotated in unison.

18. A process for metering particulate material as set forth in claim 16 which includes the additional step of:

passing the particulate material, in free fall, through an open space after the material is fed through the holes in the plate and before the material is received into the second aeration and fluidization zone.

19. A process for metering particulate material as set forth in claim 16 which includes the additional step of:

bottom unloading particulate material through the annular opening in the lower conical member into the metering chamber.

20. A process for metering particulate material as set forth in claim 16 which includes the additional steps of:

catching the particulate material flowing out through the metering holes in a collection hopper;
entraining the particulate material caught in the collection hopper in a flow of gas;
transporting the entrained particulate material to a remote location.

21. A metering system for particulate materials comprising:

a substantially horizontally disposed particulate material support surface; means for maintaining a generally constant level of particulate material on said support surface;
a metering surface extending along and upwardly from the support surface to a metering edge;
a distributor blade including portions extending horizontally adjacent to the support surface and upwardly adjacent to the metering surface said distributor blade portions further including means which contact the particulate material; and
means for moving the distributor blade along the metering surface moving a mound of particulate material radially outward, said material having an upper surface extending at the natural angle of repose of the particulate material through points in the plane of the metering surface which are above the metering edge so that particulate material from the top of the mound flows over the metering edge under the action of gravity.

22. A metering system for particulate materials as set forth in claim 21 wherein the particulate material support surface is defined by passage of the bottom edge of the horizontally extending portion of the distributor blade along the upper surface of a quantity of stationary particulate material.

23. A metering system for particulate material as set forth in claim 21 wherein:

the material support surface is substantially circular, the metering surface is cylindrical and the metering edge comprises the lower edges of an annular array of port holes formed through the metering surface a preselected height above the support surface.

24. A metering system as set forth in claim 23 wherein the lower outside surfaces adjacent to the port holes are beveled to form sharp lower edges on the port holes to prevent the accumulation of particulate material therein.

25. A metering system as set forth in claim 21 wherein the moving means includes:

a motor mounted below the material support surface and having a drive shaft extending up through the support surface; and
means for fixing the distributor blade to the drive shaft of the motor for rotation therewith.

26. A volumetric system for particulate materials comprising:

a circular, substantially horizontally disposed particulate material support surface; means for maintaining a generally constant level of particulate material on said support surface;
a cylindrical metering surface extending around and upwardly from the support surface and having a plurality of apertures formed through it;
a distributor blade having at least one arm extending outwardly above the support surface and then upwardly adjacent the metering surface said distributor blade having means which contact tha particulate material; and
means for rotating the distributor blade and thereby radially moving a mound of particulate material along the metering surface so that particulate material from the mound flows from the upper portion of the mound out through the apertures in the metering surface under the action of gravity.

27. A volumetric metering system for particulate materials as set forth in claim 26 wherein the apertures through the metering surface are formed with sharp lower edges.

28. A volumetric metering system for particulate materials as set forth in claim 26 wherein:

the means on the distributor blade include air-foil like leading edges and a flat vertically extending trailing surface to aerate and fluidize particulate material located above the support surface as the blade is rotated.

29. A volumetric metering system for particulate material as set forth in claim 26 wherein each arm of the distributor blade comprises:

a circular rod formed to extend outwardly above the support surface, upwardly adjacent the metering surfaces and inwardly above, parallel to, and spaced from the outwardly extending portion thereof.

30. A volumetric metering system for particulate material as set forth in claim 26 which also includes:

means for aerating and fluidizing particulate material to be metered onto the material support surface.

31. A volumetric metering system as set forth in claim 26 which also includes:

means for catching the particulate material flowing out through the apertures in the metering surface;
means for entraining the caught particulate material in a flow of gas; and
means for transporting the entrained particulate material to a remote location.

32. A system for metering particulate material, comprising:
- a storage hopper for containing a mass of said material, said hopper having a bottom opening therein;
- a pressure release plate mounted in and closing the bottom opening in said hopper, said plate having a plurality of downwardly and outwardly beveled holes therein;
- an upper orb-sweep rotatably mounted above said pressure release plate;
- an upper orb-sweep wire fixed to said upper orb-sweep and extending radially outward adjacent the upper surface of said plate;
- a conical metering hopper located below said pressure release plate for collecting material passing through the holes in said plate, the wall of said hopper tapering downwardly and inwardly to define a central feeding opening at the bottom thereof;
- a distributor ring located beneath the central feeding opening in said metering hopper, said distributor ring comprising a circular substantially horizontally disposed particulate material support surface and a cylindrical metering surface extending around and upwardly from the support surface and having a plurality of port holes formed therethrough;
- a distributor blade rotatably mounted with said distributor ring and having at least one arm extending outwardly above the support surface and then upwardly adjacent the metering surface;
- a lower orb-sweep wire fixed to said distributor blade and extending up through the central feeding opening and parallel and adjacent to the inner surface of said metering hopper;
- means for linking said distributor blade and said upper orb-sweep for conjoint rotation;
- a collecting hopper located beneath said distributor ring;
- means for rotating said distributor blade to (a) move said upper orb-sweep wire adjacent the upper surface of said pressure release plate to fluidize and bottom unload particulate material from said storage hopper through the holes in said pressure release plate and into said metering hopper, (b) move said lower orb sweep wire adjacent the inner surface of said metering hopper to fluidize and bottom unload particulate material through said central feeding opening into said distributor ring, and (c) rotate said distributor blade and move a mound of particulate material along the metering surface of said distributor ring to allow a predetermined fraction of the mound to flow, by gravitation action, through the port holes in the metering surface into said collecting hopper.

33. A system for metering particulate material as set forth in claim 32 which also includes:
a horizontally extending top pressure plate mounted above the upper orb-sweep for supporting a portion of the weight of the mass of particulate material thereabove to permit the orb-sweep to rotate freely.

34. A system for metering particulate material as set forth in claim 32 wherein said upper and lower orb-sweep wires are formed of a resilient flexible material.

35. A system for metering particulate material as set forth in claim 32 which also includes:

a material diverter cone mounted beneath said pressure relief plate, said cone having a downwardly and outwardly directed wall which extends beneath all of the holes in the pressure relief plate and defines an annular space between the outer periphery of said cone and the inner periphery of the metering hopper for the passage of particulate material into the metering hopper.

36. A system for metering particulate material as set forth in claim 32 wherein the distributor blade includes at least three arms equally spaced about the blade from one another.

37. A system for metering particulate material as set forth in claim 32 which also includes:
- means for entraining the particulate material in the collection hopper in a moving flow of air; and
- means for transporting the entrained particulate material to a remote location.

38. A system for metering particulate material as set forth in claim 32 wherein each arm of the distributor blade comprises:
- an air-foil like leading edge to get beneath particulate material and pass the material across the upper surface thereof as the arm is moved;
- a flat vertically extending trailing edge to permit particulate material passing across the surface of the blade to fall freely back to the material support surface, thereby aerating and fluidizing the material, and
- a rounded fillet between the outwardly and upwardly extending portions for allowing a portion of the mound to flow over the arm and thereby form a mound having a fixed geometric shape.

39. A system for metering particulate material including:
- means for bottom unloading particulate material from a hopper into a particulate material aeration and fluidization zone;
- means for aerating and fluidizing the particulate material within the aeration and fluidization zone so that the mass of particulate material per unit of volume is substantially constant throughout the aeration and fluidization zone;
- means for bottom unloading particulate material out of the aeration and fluidization zone into a metering zone comprising a support surface and a metering surface extending upwardly from the support surface and having a plurality of particulate material discharge ports formed through it at a predetermined height above the support surface;
- means for forming a mound of particulate material on the support surface in the metering zone characterized by an upper surface extending at the natural angle of repose of the particulate material to a level on the metering surface which is above the particulate material discharge ports formed therein; and
- means for radially moving the mound of particulate material outwardly around the metering surface in the metering zone so that particulate material from the upper portion of the mound continuously flows out through the particulate material discharge ports in the metering surface under the action of gravity.

40. A system for metering particulate material as set forth in claim 39 which also includes:

means for catching the particulate material flowing out through the discharge ports in a collection hopper;
means for entraining the particulate material caught in the collection hopper in a flow of air;
means for transporting the entrained particulate material to a remote location.

* * * * *

PO-1050
(5/69)

UNITED STATES PATENT OFFICE
CERTIFICATE OF CORRECTION

Patent No. 3,804,303  Dated April 16, 1974

Inventor(s) Arthur L. Fassauer

It is certified that error appears in the above-identified patent and that said Letters Patent are hereby corrected as shown below:

Col. 2, line 15, "art device" should be --art devices;
        line 41, "to metering" should be --to a metering--.
Col. 3, line 15, "orbsweep" should be --orb-sweep--;
        line 20, "orbsweep" should be --orb-sweep--.
Col. 11, line 39, "blade" should be --blades--.
Col. 12, line 21, "along it that" should be --along in that--;
        line 22, "angles of repose" should be --angle of repose--.
Col. 13, line 21, "gravity and th" should be --gravity and the--;
        line 55, "speed reduer" should be --speed reducer--.
Col. 14, line 30, "materails" should be --materials--;
        Table I, Row 2, Col. 2, "0.15-0.001" should be --0.15-0.005--.
Col. 15, line 25, "material and hopper" should be --material the hopper--.
Col. 16, line 14, "with is" should be --which is--;
        line 28, "additional step" should be --additional steps--;
        line 56, "unformly" should be --uniformly--.
Col. 19, line 38, Immediately following ";" indent for new paragraph starting with "means for".
Col. 20, line 18, Immediately following ";" indent for new paragraph starting with "means for";
        line 27, "contact tha" should be --contact the--.

Signed and sealed this 4th day of March 1975.

(SEAL)
Attest:

RUTH C. MASON
Attesting Officer

C. MARSHALL DANN
Commissioner of Patents
and Trademarks